(12) United States Patent
Herron (10) Patent No.: US 12,488,640 B1
(45) Date of Patent: Dec. 2, 2025

(54) VEHICLE DIAGNOSTIC SYSTEM AND METHOD

(71) Applicant: Opus IVS, Inc., Ann Arbor, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 309 days.

(21) Appl. No.: 17/945,519

(22) Filed: Sep. 15, 2022

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/085* (2013.01); *G07C 2205/02* (2013.01)

(58) Field of Classification Search
CPC ...... G07C 5/0808; G07C 5/008; G07C 5/085; G07C 2205/02
See application file for complete search history.

(56) References Cited

U.S. PATENT DOCUMENTS

| | | | | |
|---|---|---|---|---|
| 2007/0055420 | A1* | 3/2007 | Krzystofczyk | G07C 5/0808 701/31.8 |
| 2014/0277909 | A1* | 9/2014 | Bertosa | G06Q 30/0613 701/29.6 |
| 2017/0301154 | A1* | 10/2017 | Rozint | G07C 5/008 |
| 2020/0219335 | A1* | 7/2020 | Gintz | G05D 1/0022 |
| 2020/0334927 | A1* | 10/2020 | Rozint | B60R 21/0136 |
| 2023/0063381 | A1* | 3/2023 | Brunda | G07C 5/008 |

* cited by examiner

*Primary Examiner* — Adnan M Mirza
(74) *Attorney, Agent, or Firm* — Gardner, Linn, Burkhart & Ondersma LLP (57) ABSTRACT

A method and system for assessing a vehicle electronic system. A vehicle diagnostic system comprises a vehicle diagnostic computer tool configured to operate in a mode to scan a vehicle for diagnostic trouble codes (DTCs). The vehicle diagnostic computer tool is connected with a diagnostic port of the vehicle to be in communication with an electronic system of the vehicle. The DTCs are reported by the vehicle's electronic system. An aftermarket diagnostic scan program is run to scan for DTCs, and the scan data acquired by the aftermarket diagnostic scan program is recorded. An original equipment manufacturer (OEM) diagnostic scan program is run to scan for DTCs, and the scan data acquired by the OEM diagnostic scan program is recorded. The scan data acquired by the aftermarket diagnostic scan program is compared to the scan data acquired by the OEM diagnostic scan program.

20 Claims, 4 Drawing Sheets

VEHICLE DIAGNOSTIC SYSTEM AND METHOD

BACKGROUND OF THE INVENTION

The present invention is directed to a vehicle diagnostic system, and in particular to performing an aftermarket or "quick scan" before or simultaneously with an original equipment automotive manufacturer ("OEM") scan, such that the aftermarket scan may be analyzed.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM for use on vehicle makes and models produced by the OEM, or applications developed by an aftermarket diagnostic company that provides such scan programs and equipment for use with vehicles manufactured by other companies. OEM diagnostic applications may include proprietary diagnostic application software exclusive to a particular OEM and may be required for certification purposes to validate repairs performed on a vehicle.

SUMMARY OF THE INVENTION

The present invention provides a vehicle diagnostic system and method, and in particular, the vehicle diagnostic system will perform a diagnostic scan using a diagnostic computer tool with both an aftermarket scan program and an original equipment scan program once a scan is ready to be performed. When a scan operation is selected, scans using both an original equipment scan program and an aftermarket scan program will be performed. The vehicle diagnostic scan using the aftermarket scan program may be performed before, after or concurrently with the scan performed using the original equipment scan program. In an aspect of the present invention, the original equipment scan program and the aftermarket scan program are performed simultaneously. Whether performed consecutively or simultaneously, scan results from the original equipment scan program and the aftermarket scan program will be recorded and saved for further analysis. The recorded scan data from both scans is statistically analyzed to determine if the aftermarket scan obtained comparable or the same results as the original equipment scan. The statistical analysis determines or evaluates whether the DTCs detected by the aftermarket scan program include all of the relevant DTCs detected by the original equipment scan program. The statistical analysis may include regression analysis and may be performed based on scans of multiple vehicles of the same make, model, and/or year, including such as on similarly equipped vehicles with regard to associated ECUs.

In an aspect of the present invention, the diagnostic system, once a particular original equipment scan program is selected, performs an aftermarket scan program, such as a "quick scan." The aftermarket scan program will be performed first or simultaneously with or after the original equipment scan program. Data from both the original equipment scan program and the aftermarket scan program will be recorded and stored. The recorded data from the scans will be statistically analyzed to determine if the aftermarket scan program obtained comparable or the same results as the original equipment scan program. The aftermarket scan program may query all or only a subset of the electronic control units (ECUs) that are scanned by the original equipment scan program. The statistical analysis determines or evaluates whether the DTCs detected by the aftermarket diagnostic scanning program include all of the relevant DTCs detected by the original equipment scan program.

In an aspect of the present invention, the aftermarket scan program is run without interaction by a technician. That is, upon launching a diagnostic scan using the diagnostic computer tool, scans are performed using both a manufacturer diagnostic scanning program and an aftermarket diagnostic scanning program. The scan results of the scan programs are recorded and saved. The results of one of the scan programs may be provided to the technician, with both the recorded results being transmitted remotely from the repair facility. For example, the technician may be provided with the results of the manufacturer diagnostic scan program for use in repairing the vehicle, while the results of both the manufacturer diagnostic scanning program and the aftermarket diagnostic scanning program are provided to a remote computer for comparative analysis, including as to whether any DTCs determined by the manufacturer scan program are also detected by the aftermarket scan program. Based on the comparative analysis, including over numerous vehicles, a confidence level can be determined as to the accuracy of the aftermarket scan program relative to the manufacturer scan program.

In another aspect of the present invention, scanning the vehicle for DTCs includes scanning electronic control units (ECUs) of the vehicle to determine whether the scanned ECUs are reporting any DTCs. A DTC reported by an ECU is referring to an error or trouble reported by the ECU.

In a further aspect of the present invention, the selected aftermarket diagnostic scanning program scans a subset of the ECUs scanned by the selected manufacturer diagnostic scanning program. The subset of ECUs scanned by the aftermarket diagnostic scanning program is less than the quantity of ECUs scanned by the manufacturer diagnostic scanning program.

In another aspect of the present invention, the statistical analysis may include regression analysis, and may be performed based on scans of multiple vehicles of the same make, model and/or year, including such as on similarly equipped vehicles with regard to associated ECUs.

These and other objects, advantages, purposes, and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
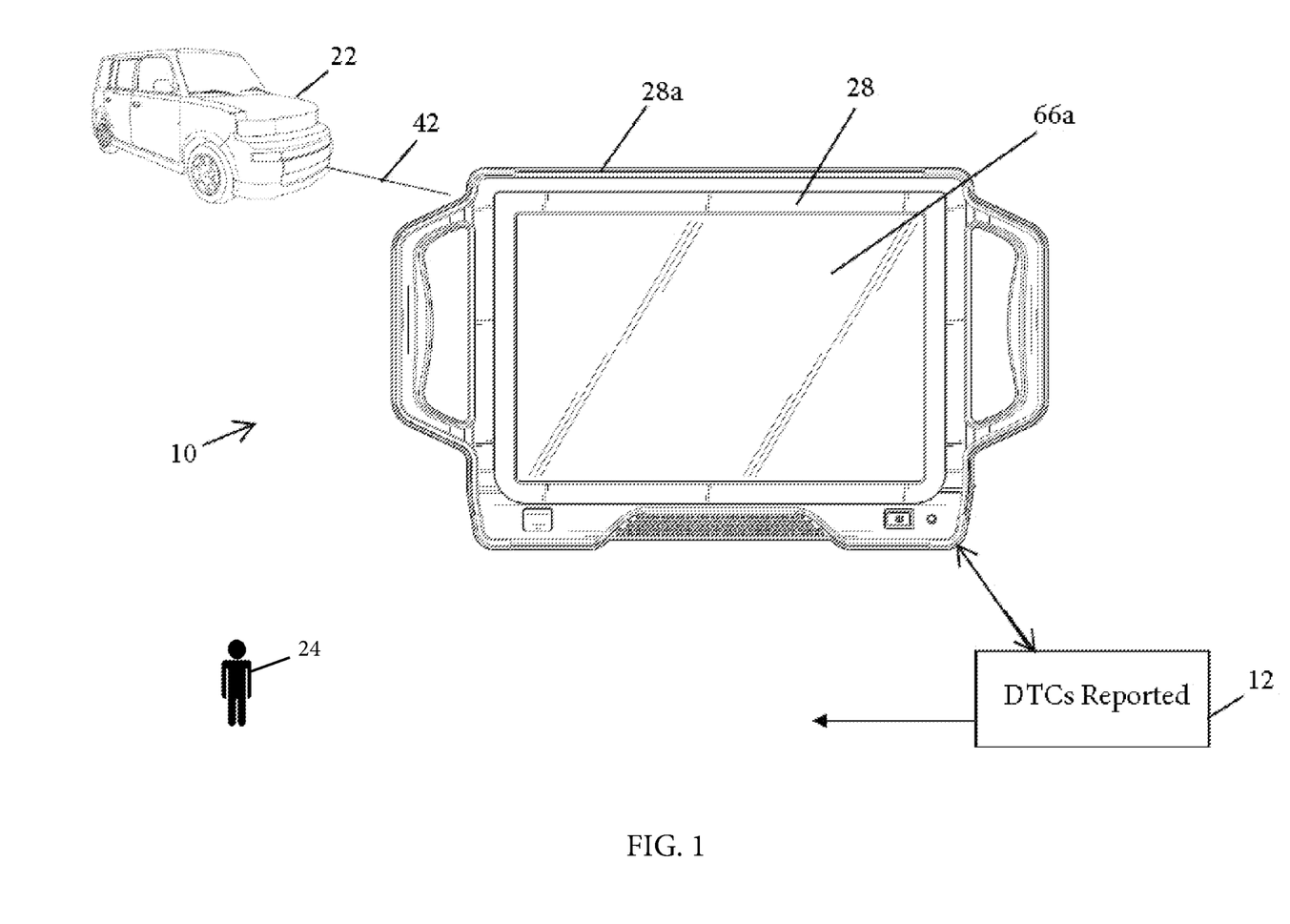
FIG. 1 is a diagram of a vehicle diagnostic system in accordance with the present invention showing a vehicle diagnostic tool connected to the electronic system of a vehicle.
Figure 2:
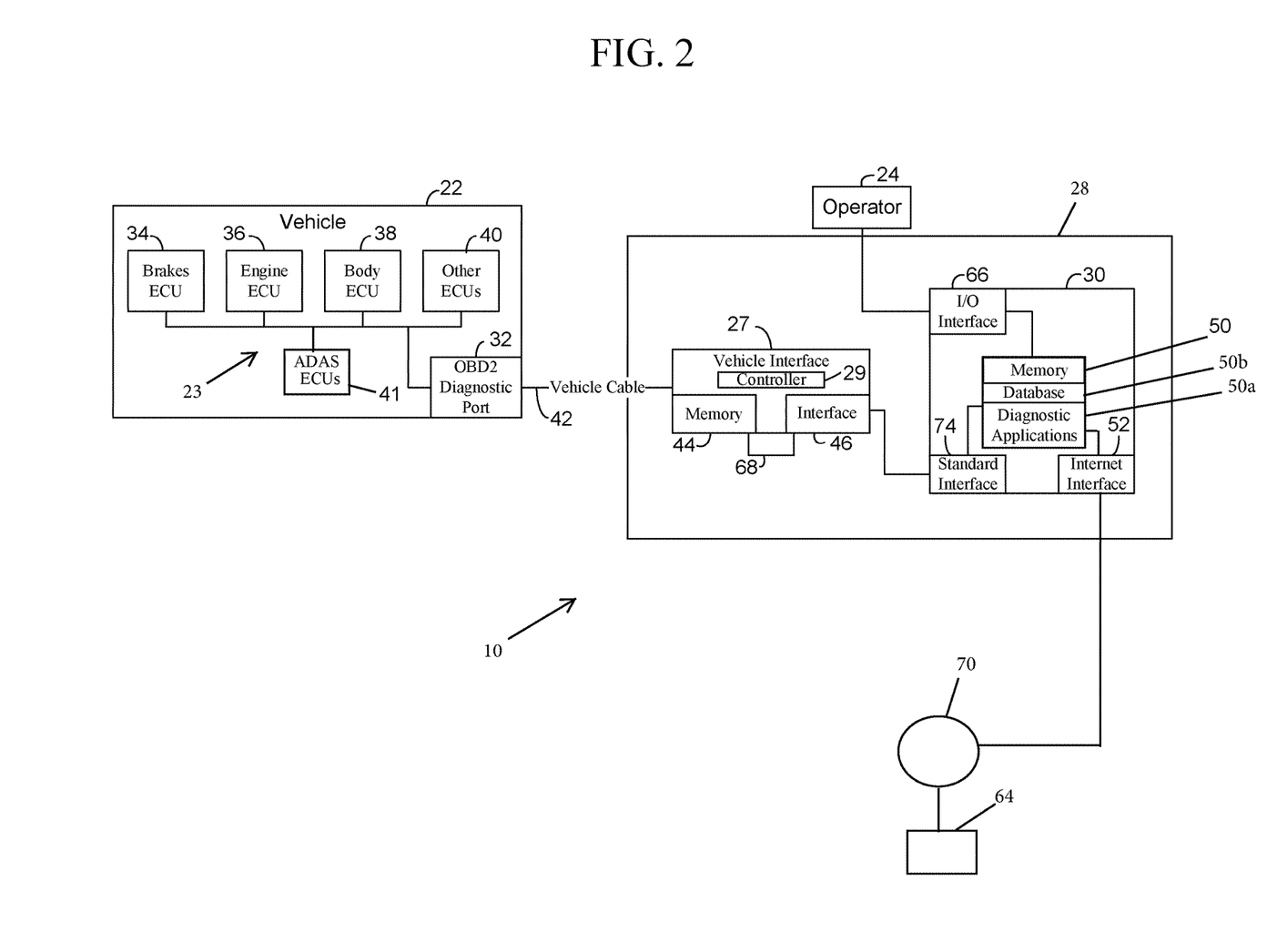
FIG. 2 is a block diagram of the vehicle diagnostic system in accordance with the present invention showing the diagnostic tool in relation to the electronic system of the vehicle.

A vehicle diagnostic system 10 for use with a vehicle 22 is shown for use by a user such as a mechanic or operator 24, such as in an automotive repair facility. System 10 is illustrated in FIGS. 1 and 2 as including a vehicle diagnostic tool 28, which as discussed in more detail below, is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including safety systems such as Adaptive Driver Assistance Systems ("ADAS") ECUs 41, and including other electronic parts and components of vehicle 22. Vehicle diagnostic tool 28 is shown connected with port 32 via vehicle cable 42 and is used to scan the electronic system 23 of vehicle 22, such as to determine any fault codes in the electronic system 23, which may be reported as diagnostic trouble codes ("DTCs") to thereby provide an indication to the mechanic 24 as to what repairs are needed on vehicle 22. Such a vehicle scan may be run prior to repairs, such as part of an initial diagnosis, and/or may be run after performing repairs, such as to confirm that vehicle 22 has been properly repaired (e.g., an after repair recertification). The vehicle diagnostic tool 28 may be equipped with or configured to access both original equipment manufacturer ("OEM") and aftermarket diagnostic scan programs or applications where, in accordance with the present invention, a diagnostic evaluation program 51 is provided with the vehicle diagnostic tool 28 that enables or causes an aftermarket diagnostic scan program 53*b* to initially be run prior to running an OEM scan program 53*a* depending on the outcome of the aftermarket diagnostic scan program. In an illustrated embodiment, the vehicle diagnostic tool 28 is configured to record and retain or transmit the scan data acquired from both the aftermarket diagnostic scan program 53*b* and the OE diagnostic scan program 53*a* to enable a comparison of the scan data, where the comparison may be performed by a remote computer 64 or by the tool 28 itself. The comparison is a statistical analysis to determine if the scan results from the aftermarket diagnostic scan program 53*b* are comparable to the scan results from the OEM diagnostic scan program 53*a*. As discussed herein, the recorded scan data can also be transmitted remotely from the repair facility for later statistical analysis.

Such a comparison of the scan data from the aftermarket diagnostic scan program 53*b* to the scan data from the OEM diagnostic scan program 53*a* provides an opportunity to statistically determine whether the scan data from the aftermarket diagnostic scan program 53*b* is the same as the scan data from the OEM diagnostic scan program 53*a*. In other words, in accordance with the present invention a statistical confidence level can be determined as to whether the aftermarket diagnostic scan program 53*b* is equivalent to or the same as the OEM diagnostic scan program 53*a*.

The vehicle diagnostic tool 28 includes a vehicle interface 27 that includes a controller 29, such as in the form of a processor or micro-processor and interface circuitry to facilitate communication between the ECUs and the vehicle interface 27, with the vehicle interface 27 including a database of vehicle protocols found in a local memory 44 that allow communication with the ECUs of various makes and models of vehicles. The vehicle interface 27 additionally includes a computer interface 46 for connection with computer 30, such as via standard interfaces 74, such as USB, Bluetooth, Wi-Fi, or the like.

Vehicle diagnostic tool 28 in the illustrated embodiment includes a housing 28*a* containing circuitry, hardware, and software, such as a vehicle interface module 27 coupled with a computer module 30. In use, tool 28 is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including ADAS ECUs 41, and including other electronic parts and components of vehicle 22. Tool 28 connects with port 32, such as via vehicle cable 42. Vehicle diagnostic tool 28 includes a controller 29, such as in the form of a processor or microprocessor and interface circuitry to facilitate communication between the ECUs and tool 28, with tool 28 including a database of vehicle protocols found in a local memory 44 that allow communication with the ECUs of various makes and models of vehicles. Vehicle diagnostic tool 28 additionally includes interfaces 46, 71 for communication between interface module 27 and computer module 30, where computer module 30 additionally includes a controller and memory. As understood from FIG. 2, vehicle diagnostic tool 28 may be connected to a remote computer, such as a server 64, such as by an Internet 70 connection.

Figure 3:
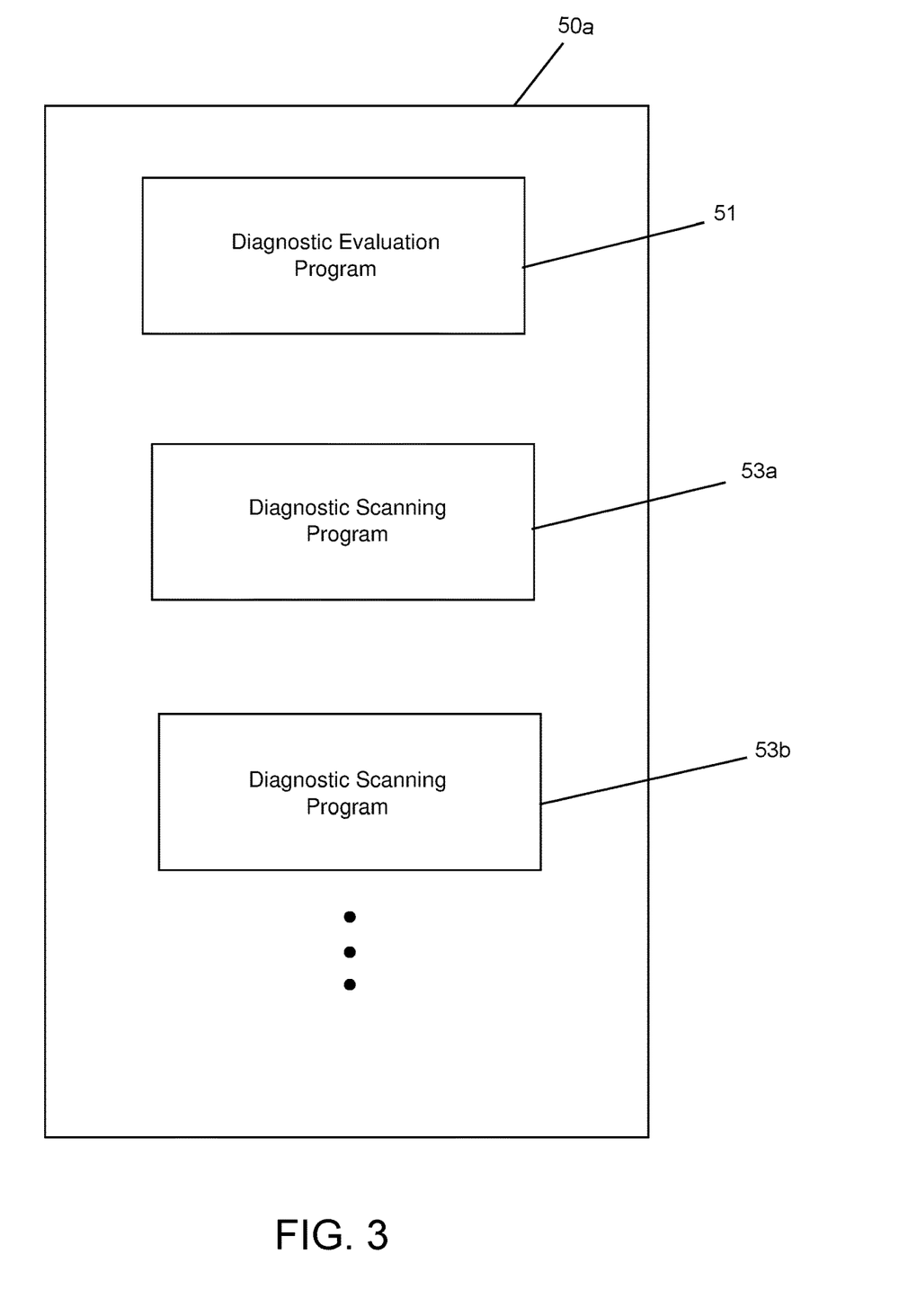
FIG. 3 is a block diagram of a plurality of diagnostic applications in accordance with the present invention.

Vehicle diagnostic system 10 may be configured to be selectively operable in one of a plurality of different modes, whereby a technician may use the diagnostic tool 28 for vehicle maintenance, diagnosis, programming, and repair as needed. In accordance with an embodiment of the present invention, the diagnostic tool's computer 30 includes a memory 50 for storing a database 50*b* and diagnostic applications 50*a*. The diagnostic applications 50*a* include a diagnostic evaluation program application 51 (FIG. 3) for querying/scanning the vehicle 22 to read vehicle data information regarding the particular ECUs that are present on the vehicle, with the vehicle data information being analyzed or parsed to determine the particular vehicle systems provided on the vehicle based on the particular ECUs that are detected. As discussed herein, the diagnostic applications 50*a* also include OEM diagnostic scanning programs 53*a* and third party diagnostic scanning programs 53*b*. Tool 28 additionally obtains any diagnostic trouble codes (DTCs) as DTC inputs 12 reported from the electronic system 23 of vehicle 22.

In the illustrated embodiment, vehicle diagnostic tool 28 includes one or more commercially available diagnostic application scan programs 53*a*, 53*b* that are configured for use with the specific vehicle 22 and may be used depending on the vehicle systems present on the vehicle 22. Although shown as having two diagnostic scanning programs 53*a*, 53*b*, it should be appreciated that the diagnostic applications 50*a* can include more than two such programs available for use with a given vehicle 22. Thus, any number of diagnostic applications 50*a* (e.g., diagnostic scanning programs 53*a*, 53*b*) can be stored in memory 50. Interface module 27 may be configured as an SAE standard J2534 device, such as a device compliant with the J2534-2 standard, or as an ISO compliant or other standard compliant device for supporting and enabling communication with the electronic systems of a vehicle.

As illustrated in FIG. 2, the diagnostic scanning programs 53*a*, 53*b* are stored in a memory 50. As also discussed herein, data from the diagnostic scanning programs 53*a*, 53*b* can be stored in database 50*b*. An exemplary diagnostic application scanning program comprises a program provided by an automotive manufacturer or a company that supplies diagnostic application programs, such as Opus IVS, Inc. of Ann Arbor, Michigan, with the diagnostic application scanning tool configured to enable the reading and reporting of fault codes in the electronic system of the vehicle such as may be located in ECUs of the vehicle. In practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the customer's selection of vehicle options. Alternatively, and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22.

It should be appreciated that different vehicles may be equipped with different ECUs, including that some vehicles of the same make/model may have different or additional ECUs when compared to other vehicles of the same make/model. For example, a given vehicle may be sold with or without advanced driver-assistance systems (ADAS), such as adaptive cruise control, lane departure warning, parking assistance, blind spot detection, and other driver assistance systems or other vehicle options. Each ADAS subsystem may include its own additional ECUs, or an ECU may be shared for more than one ADAS feature, where such additional ECUs must be queried/scanned, accessed, and then assessed. It should be appreciated that vehicles with the additional ADAS subsystems and corresponding additional ECUs will require a more extensive scanning program that is capable of interfacing with the additional ECUs of the equipped ADAS subsystems. Correspondingly, the same vehicle make and model without additional ADAS subsystems will not have the additional ECUs.

Interfacing and interrogation with every ECU of a vehicle allows all fault codes to be ascertained. An OEM diagnostic scan program 53a may operate to perform an in-depth scan regardless of the vehicle configuration, including whether or not the vehicle includes ADAS systems, whereby all possible ECUs for a particular model of a vehicle are routinely queried by the vehicle diagnostic system 10 whether they are actually in the vehicle 22 or not. While a proprietary manufacturer supplied scanning program may provide an assurance that all ECUs on a vehicle under test have been queried/scanned and assessed, such scanning programs are often costly, including in terms of requiring a significant length of time to operate as the scanning program methodically queries/scans for each ECU the vehicle may be equipped with, whether or not the vehicle is in fact equipped with any given ECU, as well as having a substantial financial cost as there are monetary charges associated with utilizing the proprietary scanning program, including such as costs for each use or running of the proprietary scanning program. Certain service operations upon their completion by the mechanic 24, require the running of the OEM supplied diagnostic scanning program 53a to "certify" the vehicle with respect to the service operations performed by the mechanic 24. Moreover, when this "certifying" scan by the OEM scanning program 53a results in one or more error/fault codes, i.e., diagnostic trouble codes (DTCs), the mechanic 24 must deal with the underlying issues related to the DTCs and then repeat the OEM scanning program 53a (with the additional monetary and time costs related to running the OEM scanning program 53a twice). Furthermore, when the OEM scanning program 53a is run twice (a first OEM scan with DTCs requiring correction, and then a second "certifying" OEM scan with no DTCs), it is possible that an insurance company won't pay for both of the OEM scans.

Therefore, prior to the mechanic 24 performing the OEM scanning program 53a (to certify the vehicle and the service operations performed by the mechanic 24), a "quick scan" of an aftermarket diagnostic scanning program 53b could be run. The quick scan performed by the aftermarket diagnostic scanning program 53b is a scan of only a portion of the ECUs that are scanned by the OEM scan. The aftermarket diagnostic scan program 53b may provide a monetary savings as well as a time savings (as opposed to running the OEM diagnostic scan program 53a multiple times). There are a variety of different criteria for including or excluding ECUs from the list of ECUs scanned by the quick scan. For example, the list of ECUs scanned by the quick scan include all the ECUs in the particular make and model of the vehicle but none of the other optional ECUs that are not included in the vehicle, but found within the OEM scan. Alternatively, the quick scan is a subset of the ECUs scanned by the OEM scan which may or may not include all of the ECUs found in the vehicle in question. Because the aftermarket diagnostic scan program 53b is not necessarily a duplicate of the corresponding OEM diagnostic scan program 53a, there is a need to be sure that the aftermarket diagnostic scan program 53b provides scan results that are comparable or the same results as the scan results of the corresponding OEM diagnostic scan program 53a. In other words, will running the aftermarket diagnostic scan program 53b provide the same scan results as running the corresponding OEM diagnostic scan program 53a?

Thus, the illustrated embodiment of the diagnostic tool 28 includes or is configured to perform a statistical analysis of the scan results from the aftermarket diagnostic scan program 53b with respect to the scan results of the OEM diagnostic scan program 53a. Such a statistical analysis is used to ascertain whether the aftermarket diagnostic scan program 53b provides an adequate review of the ECUs in question that are scanned by the OEM diagnostic scan program 53a.

Still further, system 20 may be configured to accept operator input to obtain vehicle data information used to select a desired diagnostic scanning program 53a, 53b appropriate to a particular vehicle 22 under test. When a diagnostic scan program 53a, 53b (e.g., the OEM diagnostic scan program 53a) is selected to be run via operator input, both the OEM diagnostic scan program 53a and the corresponding aftermarket diagnostic scan program 53b are performed. If the OEM diagnostic scan program 53a is selected by an operator, then the aftermarket diagnostic scan program 53b is performed in the background.

In an aspect of the present embodiment, the operator need not be aware that one or the other of the diagnostic scan programs is being run. For example, diagnostic computer tool 28 may include a button or field selectable by the operator 24 via a touch screen 66a to launch a diagnostic scan for the vehicle 22. The diagnostic computer tool 28 may then launch scans with both the OEM scan program 53a and the aftermarket scan program 53b, including without notification via the tool 28. For example, the operator 24 may be aware that a diagnostic scan is being run, but not be aware that two diagnostic scans are being run. In a particular embodiment, the operator 24 may be provided with results of the OEM scan program 53a, such as via display on screen 66a or a report generated by tool 28 comprising an electronic file that may be stored and/or printed. In a particular embodiment the operator 24 may be aware that an OEM scan is being performed, or simply that a diagnostic scan is being performed without specific reference to whether the scan is from an OEM or aftermarket scan program. That is, the aftermarket diagnostic scan program 53b may be run without interaction by the operator. Thus, regardless of the scan requested (either an OEM or an aftermarket diagnostic scan program), both the OEM diagnostic scan program 53a and the aftermarket diagnostic scan program 53b are run and their scan results recorded and saved in the memory 50 for statistical analysis. In an aspect of the present embodiment, the recorded scan results are stored in the database 50b.

As described herein (and illustrated in FIG. 5), how well the quick scan of the aftermarket diagnostic scanning program 53b compares to the full OEM diagnostic scanning program 53a is determined by comparing the recorded scan results from the aftermarket diagnostic scan program 53b to the recorded scan results from the OEM diagnostic scan program 53a. The scan data from the "quick scan" can then be statistically compared to the scan data from the OEM scan to determine any differences between the two scans (e.g., whether the quick scan is missing one or more ECMs that also need to be scanned to certify the vehicle). By statistically analyzing the scan data from both the quick scan and the OEM scan, it can be determined whether the quick scan is obtaining results comparable to the results from the OEM scan. For example, did the aftermarket diagnostic scan program 53b catch all the relevant DTCs that were reported by the OEM diagnostic scan program 53a? Such statistical analysis can be performed by computer 30 or via a remote computer (e.g., server 64).

As discussed herein, the comparative analysis, either performed by computer 30 or via a remote computer, e.g., server 64, includes statistical analysis that may include regression analysis to determine whether the scan data acquired by the aftermarket diagnostic scan program 53b is comparable or the same results as the OEM diagnostic scan program 53a. The statistical analysis may be performed on just the immediate data recorded and saved to memory 50, or the statistical analysis may be performed on a plurality of data sets that were previously recorded and stored in memory 50. Such data sets would include the scan data from multiple vehicles of the same make, model, and/or year, including such as on similarly equipped vehicles with regard to associated ECUs.

Thus, upon an operator/technician launching a diagnostic scan using the computer 30, scans are performed using both an OEM diagnostic scan program 53a and an aftermarket diagnostic scan program 53b. The scan results are recorded and saved. The results of one of the scan programs may be provided to the operator/technician, with both the recording scan results being transmitted remotely from the repair facility. Alternatively, the recorded scan results remain on the memory 50 for local analysis. As discussed herein, the recorded scan results are then provided to a computer for comparative analysis, including as to whether any DTCs determined by the manufacturer scan program are also detected by the aftermarket scan program. Based on the comparative analysis, including over numerous vehicles, a confidence level can be determined as to the accuracy of the aftermarket scan program relative to the manufacturer scan program.

Figure 4:
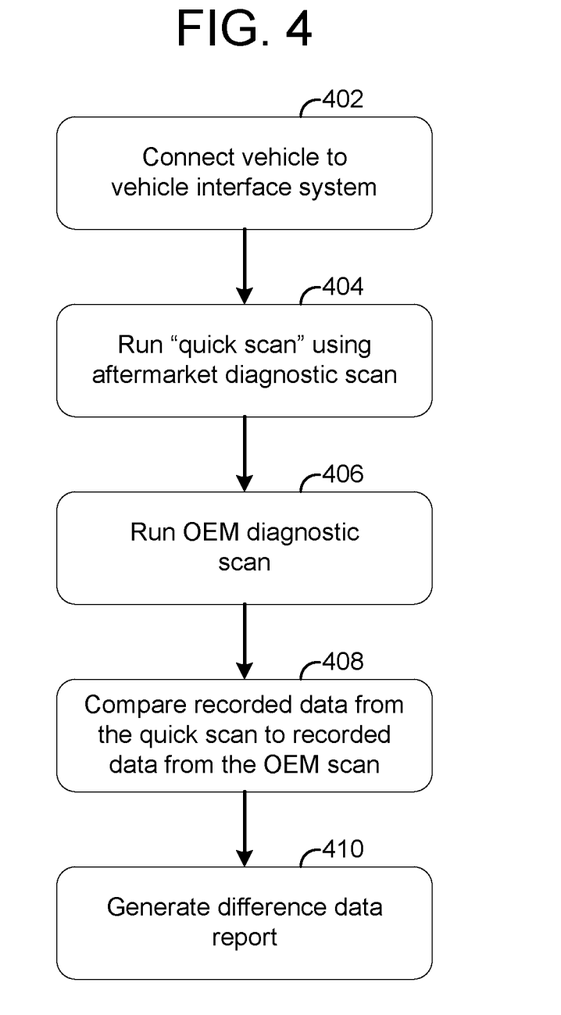
FIG. 4 is a flow chart illustrating the steps to a method for evaluating an aftermarket scan with respect to an original equipment scan program in accordance with the present invention.

A method for evaluating an aftermarket scan with respect to an original equipment scan program in an aspect of the present invention is illustrated in FIG. 4. In step 402 of FIG. 4, a vehicle 22 to be evaluated is communicatively coupled to a vehicle diagnostic tool 28 via a vehicle cable 42. In step 404 of FIG. 4, a scan (e.g., a "quick scan") is run by an aftermarket diagnostic scan program 53b, where queries are sent to the vehicle 22, which is responded to by a plurality of ECUs on the vehicle 22. Scan data from the aftermarket diagnostic scan program 53b is recorded and stored in memory 50 for later comparison. In step 406 of FIG. 4, a "full" scan by the OEM diagnostic scanning program 53a is run (which also queries ECUs on the vehicle 22). The scan data from the OEM diagnostic scanning program 53a is also recorded and stored in memory 50 for later comparison. In step 508 of FIG. 5, the recorded scan data from both the aftermarket diagnostic scan program 53b and the OEM diagnostic scanning program 53a are statistically compared. In step 510, a difference data report is generated based upon the statistical analysis of the scan data. As discussed herein, the difference data may be acquired via statistical analysis, such as regression analysis, and may be performed based on local data or based on multiple sets of scan data acquired from the scans of multiple vehicles of the same make, model, and/or year, including such as on similarly equipped vehicles with regard to associated ECUs. This allows a comparison of multiple runs of the scan programs 53a, 53b on multiple vehicles with the same (or nearly the same) set of associated ECUs.

Diagnostic tool 28 may, either in addition to the above noted various loaded diagnostic scanning applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

System 10, in addition to performing scanning operations, may also be used for reprogramming of vehicle 22, such as reprogramming selected ECUs, including reprogramming ECUs based on a determination of particular fault codes.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments, the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle interface diagnostic tool 28 is disclosed as including both the diagnostic evaluation program 51 as well as multiple diagnostic scanning programs 53a, 53b. It should be appreciated that alternative arrangements may be employed within the scope of the present invention. For example, program 51 and/or programs 53a, 53b may reside on different devices. For example, an operator 24 may first utilize one device with a diagnostic evaluation program 51 to determine which diagnostic evaluation program is appropriate for the vehicle 22, and then select from alternative computer devices to run the determined diagnostic evaluation program. Still further, although diagnostic evaluation program 51 and diagnostic scanning programs 53a, 53b are illustrated and discussed herein as being separate programs, one or more of such programs may be combined together and operate as subroutines.

The vehicle interface tool 28 may be used to scan ECUs of a vehicle under test for error codes while using a scanning program that performs a rapid scan of a minimum number of ECU queries possible (e.g., the quick scan of a third party diagnostic scanning program). Less costly and faster scanning programs, such as the third-party supplied scanning programs may be used before running a manufacturer supplied scanning program. Thus, unexpected DTCs may be identified and addressed before the manufacturer supplied scanning program is run (thereby avoiding the necessity of running the manufacturer supplied scanning program twice). Thus, when appropriate, a vehicle under test may be scanned for ECU error codes using a more efficient and minimally expensive with respect to monetary cost and test duration scanning program that queries/scans a substantial majority of the vehicle's ECUs before running the manufacturer supplied scanning program.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of assessing the operation of a vehicle diagnostic scan of a vehicle electronic system, said method comprising:
    providing a vehicle diagnostic system comprising a vehicle diagnostic computer tool configured to operate in a mode to scan a vehicle for diagnostic trouble codes (DTCs) using either an original equipment manufacturer (OEM) diagnostic scan program or an aftermarket diagnostic scan program;
    connecting said vehicle diagnostic computer tool with a diagnostic port of a selected vehicle to be in communication with an electronic system of the selected vehicle;
    performing an aftermarket diagnostic scan of the electronic system of the selected vehicle utilizing an aftermarket diagnostic scan program to scan for DTCs and recording scan data acquired by the aftermarket diagnostic scan program comprising aftermarket scanned DTCs;
    automatically performing an OEM diagnostic scan of the electronic system of the selected vehicle utilizing an OEM diagnostic scan program to scan for DTCs and recording scan data acquired by the OEM diagnostic scan program comprising OEM scanned DTCs;
    storing in a database the scan data acquired by the aftermarket diagnostic scan program and the scan data acquired by the OEM diagnostic scan program; and
    evaluating the operation of the aftermarket diagnostic scan program by comparing any obtained aftermarket scanned DTCs to any obtained OEM scanned DTCs;
    wherein said performing the aftermarket diagnostic scan and said automatically performing the OEM diagnostic scan both occur after said connecting said vehicle diagnostic computer tool with the diagnostic port of the selected vehicle and prior to disconnecting said vehicle diagnostic computer tool with the diagnostic port of the selected vehicle; and
    wherein said performing the aftermarket diagnostic scan occurs separately from and either before or after or simultaneously with said automatically performing the OEM diagnostic scan; and
    wherein at least a portion of the electronic system of the selected vehicle is scanned by both the aftermarket diagnostic scan and the OEM diagnostic scan, and wherein said evaluating the operation of the aftermarket diagnostic scan program by comparing any obtained aftermarket scanned DTCs to any obtained OEM scanned DTCs is done based on the portion of the electronic system of the selected vehicle that is scanned by both the aftermarket diagnostic scan and the OEM diagnostic scan.

2. The method of claim 1, wherein scanning the selected vehicle for DTCs comprises scanning electronic control units (ECUs) of the selected vehicle to determine whether the scanned ECUs reported DTCs, and wherein a DTC reported by an ECU is referring to an error or trouble reported by the ECU.

3. The method of claim 2, wherein the aftermarket diagnostic scan program scans a subset of the ECUs scanned by the OEM diagnostic scan program, and wherein the subset of ECUs scanned by the aftermarket diagnostic scan program is less than the quantity of ECUs scanned by the OEM diagnostic scan program.

4. The method of claim 2, wherein the comparison of any obtained aftermarket scanned DTCs to any obtained OEM scanned DTCs comprises comparing the set of ECUs scanned by the aftermarket diagnostic scan program and the obtained aftermarket scanned DTCs to the set of ECUs scanned by the OEM diagnostic scan program and the obtained OEM scanned DTCs.

5. The method of claim 4, wherein the comparison of any obtained aftermarket scanned DTCs to any obtained OEM scanned DTCs comprises determining whether the obtained aftermarket DTCs include all of the relevant DTCs included in the obtained OEM scanned DTCs.

6. The method of claim 1 further comprising providing the scan data from both the aftermarket diagnostic scan program and the OEM diagnostic scan program to a remote computer for comparative analysis.

7. The method of claim 1, wherein said connecting said vehicle diagnostic computer tool, said performing an aftermarket diagnostic scan, said automatically performing an OEM diagnostic scan, and said storing in a database is performed for a plurality of vehicles, and wherein comparing any obtained aftermarket scanned DTCs to any obtained OEM scanned DTCs comprises a comparative statistical analysis of the plurality of scan data sets from the plurality of vehicles of the same make, model, and/or year, such that the vehicles in the plurality of vehicles are similarly equipped vehicles with regard to associated electronic control units, wherein each scan data set of the plurality of scan data sets comprises respective sets of any obtained aftermarket scanned DTCs and any obtained OEM scanned DTCs, and wherein the comparative statistical analysis provides a confidence level as to the accuracy of the aftermarket diagnostic scan program relative to the OEM diagnostic scan program.

8. The method of claim 7, wherein the comparative statistical analysis comprises a regression analysis.

9. A vehicle diagnostic system for assessing the operation of a vehicle diagnostic scan of a vehicle electronic system, the system comprising:
  a vehicle diagnostic computer tool configured to be communicatively coupled to an electronic system of a selected vehicle in order to diagnose the electronic system of the selected vehicle, wherein the vehicle diagnostic computer tool is configured to operate in a mode to scan the selected vehicle for diagnostic trouble codes (DTCs) using either an original equipment manufacturer (OEM) diagnostic scan program or an aftermarket diagnostic scan program;
  wherein the DTCs are reported by the vehicle's electronic system;
  wherein the vehicle diagnostic computer tool is operable to enable an operator to select either an OEM diagnostic scan program or an aftermarket diagnostic scan program to perform a diagnostic scan of the electronic system of the selected vehicle;
  wherein the vehicle diagnostic computer tool is operable to automatically perform a diagnostic scan of the electronic system of the selected vehicle utilizing the other of the selected one of the OEM diagnostic scan program or the aftermarket diagnostic scan program;
  wherein the vehicle diagnostic computer tool is configured to perform an aftermarket diagnostic scan of the electronic system of the selected vehicle utilizing the aftermarket diagnostic scan program to scan for DTCs and to record scan data acquired by the aftermarket diagnostic scan program comprising aftermarket scanned DTCs;
  wherein the vehicle diagnostic computer tool is configured to perform an OEM diagnostic scan of the electronic system of the selected vehicle utilizing the OEM diagnostic scan program to scan for DTCs and to record scan data acquired by the OEM diagnostic scan program comprising OEM scanned DTCs;
  wherein the vehicle diagnostic computer tool is configured to store in a database the scan data acquired by the aftermarket diagnostic scan program and the scan data acquired by the OEM diagnostic scan program;
  wherein the vehicle diagnostic computer tool or a separate computer is configured to evaluate the operation of the aftermarket diagnostic scan program by comparing any obtained aftermarket scanned DTCs to any obtained OEM scanned DTCs;
  wherein the vehicle diagnostic computer tool is configured to perform the aftermarket diagnostic scan separately from and either before or after or simultaneously with performing the OEM diagnostic scan.

10. The system of claim 9, wherein the vehicle diagnostic computer tool is configured to use a diagnostic scan program to scan electronic control units (ECUs) of the selected vehicle to determine whether the scanned ECUs reported DTCs, and wherein a DTC reported by an ECU is referring to an error or trouble reported by the ECU.

11. The system of claim 10, wherein the selected aftermarket diagnostic scan program is configured to scan a subset of the ECUs scanned by the selected OEM diagnostic scan program, and wherein the subset of ECUs scanned by the aftermarket diagnostic scan program is less than the quantity of ECUs scanned by the OEM diagnostic scan program.

12. The system of claim 10, wherein the vehicle diagnostic computer tool is configured to compare the set of ECUs scanned by the aftermarket diagnostic scan program and the obtained aftermarket scanned DTCs to the set of ECUs scanned by the OEM diagnostic scan program and the obtained OEM scanned DTCs.

13. The system of claim 10, wherein the vehicle diagnostic computer tool is configured to compare any obtained aftermarket scanned DTCs to any obtained OEM scanned DTCs by determining whether the obtained aftermarket DTCs include all of the relevant DTCs included in the obtained OEM scanned DTCs.

14. The system of claim 9, wherein the vehicle diagnostic computer tool is configured to provide the scan data from both the aftermarket diagnostic scan program and the OEM diagnostic scan program to a remote computer for comparative analysis.

15. The system of claim 14, wherein the comparative analysis comprises a statistical analysis of a plurality of scan data sets from a plurality of vehicles of the same make, model, and/or year, such that the vehicles in the plurality of vehicles are similarly equipped vehicles with regard to associated electronic control units, wherein each scan data set of the plurality of scan data sets comprises respective sets of any obtained aftermarket scanned DTCs and any obtained OEM scanned DTCs, and wherein the comparative analysis provides a confidence level as to the accuracy of the aftermarket diagnostic scan program relative to the OEM diagnostic scan program.

16. The system of claim 15, wherein the statistical analysis comprises a regression analysis.

17. A method of assessing the operation of a vehicle diagnostic scan of a vehicle electronic system, said method comprising:
  providing a vehicle diagnostic system comprising a vehicle diagnostic computer tool configured to operate in a mode to scan a vehicle for diagnostic trouble codes (DTCs) using either an original equipment manufacturer (OEM) diagnostic scan program or an aftermarket diagnostic scan program;
  connecting said vehicle diagnostic computer tool with a diagnostic port of a selected vehicle to be in communication with an electronic system of the selected vehicle;
  selecting either an OEM diagnostic scan program or an aftermarket diagnostic scan program to perform a diagnostic scan of the electronic system of the selected vehicle;
  performing the diagnostic scan of the electronic system of the selected vehicle utilizing the selected one of the OEM diagnostic scan program or the aftermarket diagnostic scan program; and
  automatically performing a diagnostic scan of the electronic system of the selected vehicle utilizing the other of the selected one of the OEM diagnostic scan program or the aftermarket diagnostic scan program;
  wherein performing an aftermarket diagnostic scan of the electronic system of the selected vehicle utilizing the aftermarket diagnostic scan program comprises scanning for DTCs and recording scan data acquired by the aftermarket diagnostic scan program comprising aftermarket scanned DTCs;
  wherein performing an OEM diagnostic scan of the electronic system of the selected vehicle utilizing the OEM diagnostic scan program comprises scanning for DTCs and recording scan data acquired by the OEM diagnostic scan program comprising OEM scanned DTCs;

storing in a database the scan data acquired by the aftermarket diagnostic scan program and the scan data acquired by the OEM diagnostic scan program; and evaluating the operation of the aftermarket diagnostic scan program by comparing any obtained aftermarket scanned DTCs to any obtained OEM scanned DTCs;

wherein said performing the aftermarket diagnostic scan and said performing the OEM diagnostic scan both occur after said connecting said vehicle diagnostic computer tool with the diagnostic port of the selected vehicle and prior to disconnecting said vehicle diagnostic computer tool with the diagnostic port of the selected vehicle; and wherein said performing the aftermarket diagnostic scan occurs separately from and either before or after or simultaneously with said performing the OEM diagnostic scan.

18. The method of claim 17, wherein said selecting either the OEM diagnostic scan program or the aftermarket diagnostic scan program comprises manually selecting either the OEM diagnostic scan program or the aftermarket diagnostic scan program via the vehicle diagnostic computer tool.

19. The system of claim 17, further comprising for a plurality of selected vehicles performing said connecting said vehicle diagnostic computer tool, said selecting either an OEM diagnostic scan program or an aftermarket diagnostic scan program, said performing the diagnostic scan utilizing the selected one of the OEM diagnostic scan program or the aftermarket diagnostic scan program, said automatically performing a diagnostic scan utilizing the other of the selected one of the OEM diagnostic scan program or the aftermarket diagnostic scan program, and said storing in a database; and wherein said comparing any obtained aftermarket scanned DTCs to any obtained OEM scanned DTCs comprises a comparative statistical analysis of the plurality of scan data sets from the plurality of vehicles of the same make, model, and/or year, such that the vehicles in the plurality of vehicles are similarly equipped vehicles with regard to associated electronic control units, wherein the comparative statistical analysis provides a confidence level as to the accuracy of the aftermarket diagnostic scan program relative to the OEM diagnostic scan program.

20. The method of claim 1, wherein said performing an aftermarket diagnostic scan of the vehicle comprises an operator manually selecting the aftermarket diagnostic scan program, and wherein said automatically performing an OEM diagnostic scan is performed without intervention by the operator.

* * * * *